June 9, 1936.  H. Y. NORWOOD  2,043,590
THERMOMETER
Filed June 27, 1933   2 Sheets-Sheet 1
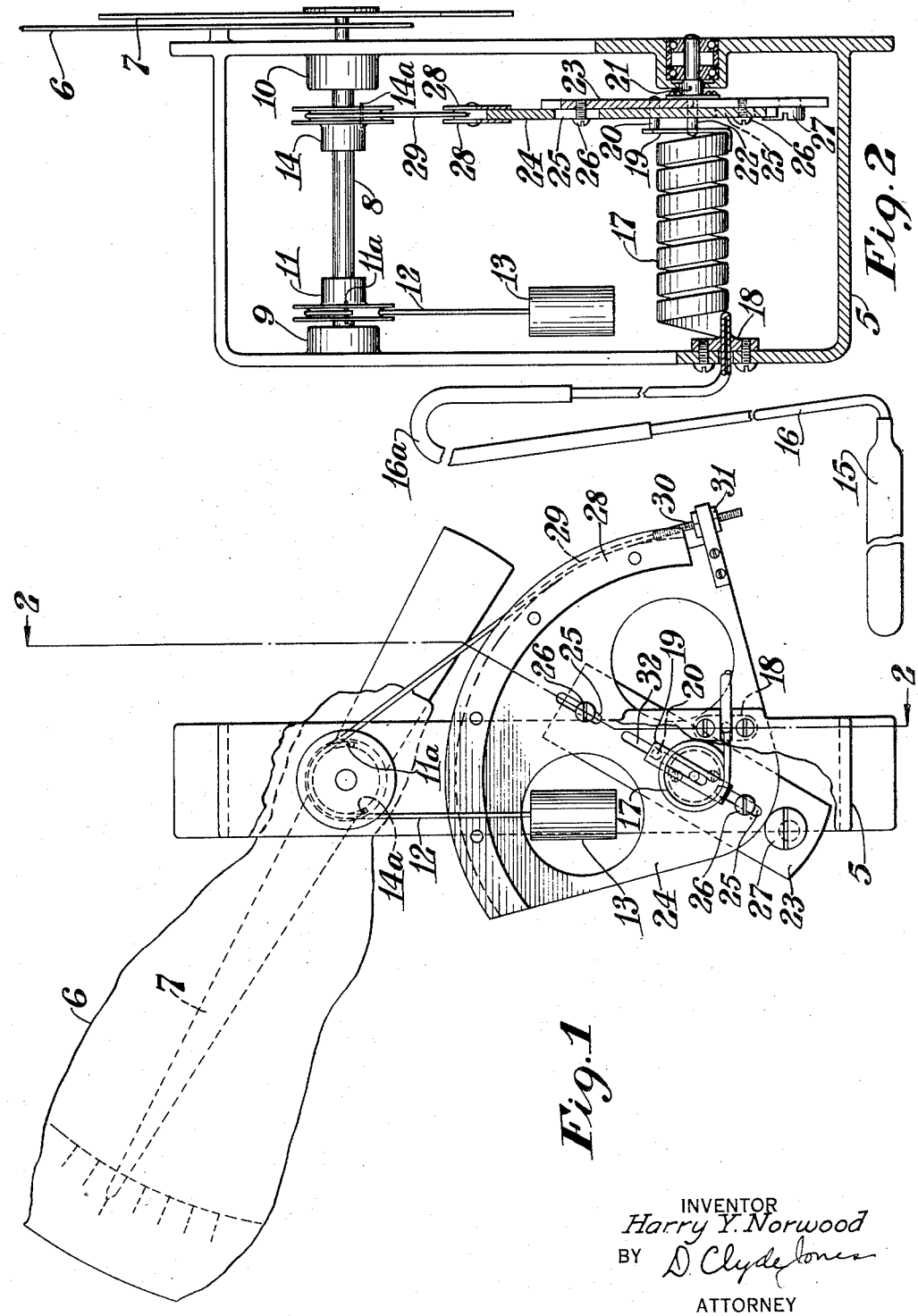
INVENTOR
Harry Y. Norwood
BY D. Clyde Jones
ATTORNEY June 9, 1936.                H. Y. NORWOOD                  2,043,590
                              THERMOMETER
                     Filed June 27, 1933         2 Sheets-Sheet 2
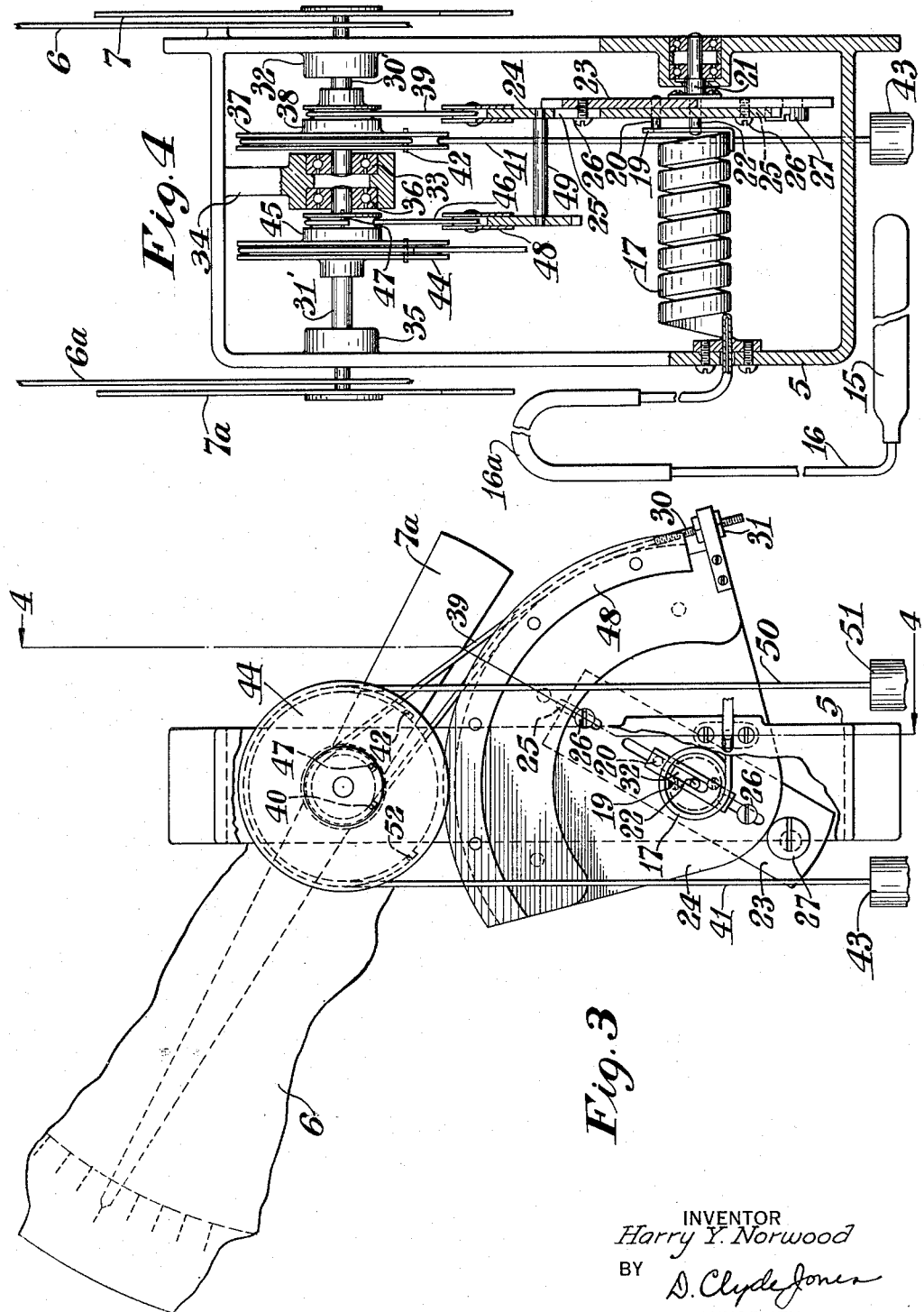
INVENTOR
Harry Y. Norwood
BY
D. Clyde Jones
ATTORNEY Patented June 9, 1936

2,043,590

UNITED STATES PATENT OFFICE 2,043,590

THERMOMETER

Harry Y. Norwood, Rush, N. Y., assignor to Taylor Instrument Companies, Rochester, N. Y., a corporation of New York Application June 27, 1933, Serial No. 677,873

4 Claims. (Cl. 73—52)

This invention relates to thermometers and more particularly to indicating thermometers.

The present invention has for its purpose a large-sized indicating thermometer which may be easily read at great distances, and which will be accurate, simple to manufacture and easy to install.

The main feature of the invention relates to a novel arrangement for transmitting the response of a thermosensitive element of an indicating thermometer to the index thereof in such a way that there will be no lost motion to introduce errors into the indication. An additional feature of the invention relates to the arrangement for calibrating the thermometer. Still another feature of the invention relates to a multi-faced indicating thermometer wherein a single thermosensitive element is utilized to actuate an index with respect to each dial, said dials having identical graduations so that it is unnecessary to calibrate each index individually.

These and other features of the invention will appear from the detailed description and claims when taken with the drawings in which Fig. 1 is a rear elevation of the thermometer of the present invention with the casing thereof omitted and with a substantial portion of the dial, as well as a part of the frame, broken away; Fig. 2 is a cross sectional view of this thermometer taken on the line 2—2 of Fig. 1; Fig. 3 shows a modified form of the invention, with certain parts broken away, wherein a dial and a cooperating index are provided on opposite sides of the thermometer so that it can be read from either side; and Fig. 4 is a cross sectional view taken on the line 4—4 of Fig. 3.

Referring especially to Figs. 1 and 2, 5 designates a rectangular frame preferably made of some cast metal on which there is supported a dial 6 suitably graduated either according to the Fahrenheit scale or according to the centigrade scale. An index or pointer 7 movable over the scale is mounted on a shaft 8 which passes through an opening in the dial and is suitably journaled at points 9 and 10 in the frame. This shaft has secured thereto a grooved pulley 11 forming part of a counterweight arrangement, which also includes a flexible element such as a chain 12 having its upper end attached at 11a to the pulley 11 and having its upper part engaging a substantial portion of the peripheral groove of the pulley, while the other end of the chain is attached to a counterweight 13.

The shaft 8 also has secured thereto a second pulley 14 which is rotated in one direction in response to changes in temperature, by means of suitable thermo-responsive mechanism. This mechanism includes a thermo-sensitive bulb 15 communicating through a capillary tube 16 with a Bourdon spring 17 together constituting a tube system, which may be filled with a suitable filling medium in accordance with the usual practice. The capillary tube includes a compensating portion 16a containing an invar core to insure that the thermometer will be responsive only to temperature changes about the bulb 15. The left hand end of the Bourdon spring 17, as viewed from Fig. 2, is fastened by a bracket 18 to one of the uprights of the frame 5, while the right hand or free end of the Bourdon spring has secured thereto an arm 19 having a crank pin 20 extending parallel to the axis of the spring. A shaft 21, journaled in a ball-bearing support in the front upright of the frame to extend coaxially with the Bourdon coil 14, has an extension 22 which projects through an opening in arm 19, to serve as a support for this arm. The shaft 21 has secured thereto a supporting member 23 to which the sector plate 24 is adjustably fastened for radial movement. In the specific arrangement shown, the sector plate is provided with radial slots 25 through which screws 26 pass into threaded openings in the supporting member to clamp the sector plate thereto in the desired adjusted relation. In order to facilitate the adjustment of the sector plate with respect to the supporting member so that very fine adjustments may be made, as in the case of calibrating the thermometer a screw 27 in threaded engagement with the member is provided with an eccentric head, which engages the lower arcuate end of the sector plate. Thus this plate may be moved outward radially by very small increments, merely by turning the eccentric head of the screw 27. The upper arcuate edge of the sector plate is provided with a groove formed by curved strips 28 fastened on the respective faces of the plate as shown. This groove serves as a guide for a chain or other flexible element 29 which has one end fastened by a threaded member 30 and the nut 31 to a corner of the sector plate. The other end of this chain is fastened at a point 14a in the groove of pulley 14 with the upper portion of the chain engaging a substantial portion of the periphery of this pulley groove.

The operation of the device will best be understood by describing how the index 7 is actuated when the temperature about bulb 15, rises. Such an increase in temperature causes the filling medium in the tube system to expand so that the Bourdon coil 17 unwinds, thereby moving the free end of the arm 19 together with its pin 20 in a clockwise direction (when viewed from the right of Fig. 2), and since pin 21 engages a slot 32 in the sector plate 24, this plate and the shaft 21 are also rotated clockwise. This movement of the plates releases the pull on the chain 29 which acts in opposition to the counterweight 13 so that the counterweight rotates the shaft 8 and the index 7 in a clockwise direction with respect to the graduations on dial 6. In like manner, when the temperature about the bulb 15 drops, the Bourdon spring winds up which causes the sector plate 24 to rotate counterclockwise (when viewed from the right of Fig. 2). As the sector plate rotates in this direction it pulls on the chain 29 which rotates the shaft 8 and index 7 counterclockwise against the force of the counterweight 13.

In the modified form of the invention shown in Figs. 3 and 4, dials 6 and 6a having identical graduated scales are mounted on opposite sides of the frame. An index or pointer 7 is movable with respect to the graduations on the dial 6, while the index or pointer 7a is similarly movable in the same direction with respect to the graduations on the dial 6a. The index 7 is mounted on shaft 30' which is journaled at 32 on the right hand upright of the frame and is also journaled at 33 in a bracket 34 suspended from the top of the frame. A grooved pulley 37 having a grooved hub 38, is fastened to the shaft 30', while a chain 39 or other flexible element has its upper end attached at 40 to the groove in hub 38 and has a substantial part of the upper portion engaging this groove. The lower portion of this chain engages a groove in the sector plate 24, mounted in the same manner as indicated in Figs. 1 and 2, and is attached to the corner thereof by the threaded element 30 and the nut 31 in the same manner as shown in Fig. 1. A second chain 41 has its upper portion engaging the groove in the pulley 37 and its upper end attached at 42 to the pulley while its lower end carries a counterweight 43. It will be noted that chains 39 and 41 when pulled downward in succession, tend to rotate the shaft 30 in opposite directions.

The index 7a is similarly mounted on a shaft 31' which passes through an opening in the dial 6a and is journaled at 35 in the left hand upright of the frame and at 36 in the bracket 34. A grooved pulley 44 having a grooved hub 45 is likewise secured to the shaft 31'. A chain 46 with its upper portion engaging the groove in the hub 45, has its upper end attached at 47 to the pulley, while its lower portion engaging the groove in an arcuate plate 48, is also joined to a corner of this plate by a threaded element 30 and a threaded nut 31. This arcuate plate 48, which is joined by a bracket 49 to the sector plate 24, has its grooved periphery of identical contour to the grooved periphery of the sector plate 24. It should be noted that the chains 46 and 39, respectively engage opposite sides of their grooved hubs 45 and 38 and are fastened at opposite points thereon, so that when the chains 36 and 39 are pulled downward, shafts 30' and 31' respectively rotate their indexes 7 and 7a counterclockwise with respect to their dials. Chain 50 at its upper portion engages the groove in the pulley 44 and has its upper end attached to the groove at point 52, while the lower end of this chain carries the counterweight 51. It should be noted that the chains 41 and 50 respectively engage opposite sides of the pulleys 44 and 37 so that when these chains are pulled downward, the shafts 30' and 31' respectively rotate their indexes 7 and 7a in a clockwise direction with respect to their dials. The mounting of the sector plate 24 and the arrangement and mountnig of the temperature-responsive system, including the Bourdon spring 17, the capillary 16 and the bulb 15 are identical with that disclosed in Fig. 1 and need not be further described.

From the foregoing description it will be obvious how the indexes 7 and 7a will be moved clockwise with respect to the graduations on their respective dials 6 and 6a on a rise in temperature at bulb 15 and will move counterclockwise with respect to these graduations on a drop in temperature at this bulb.

I claim:

1. In a thermometer, a graduated dial, a shaft provided with an index movable with respect to said dial, means tending to move said shaft in one direction, thermosensitive mechanism including a Bourdon spring having one fixed end and a movable end, an arm having one end attached to the movable end of the Bourdon spring perpendicular to the axis thereof, a rotatable shaft mounted coaxially with the axis of the Bourdon spring, a member mounted on said second shaft, means connecting the free end of said arm to said member to rotate the same, and a flexible connection from said member to said first-mentioned shaft.

2. In a thermometer, a graduated scale, a rotatable shaft provided with a pulley and with an index movable with respect to said scale, means tending to move said shaft in one direction, thermosensitive mechanism including a Bourdon spring having one fixed end and a movable end, an arm having one end attached to the movable end of the Bourdon spring perpendicular to the axis thereof, a second rotatable shaft mounted coaxially with the axis of the Bourdon spring, a sector plate having a radial slot and mounted on said second shaft, a pin attached to the free end of said arm at right angles thereto and engaging the radial slot in said plate to rotate the same, and a flexible element connected at one end to said plate in engagement with the arcuate periphery of said plate and connected at its other end to said pulley in engagement with a portion of the periphery thereof.

3. In a thermometer, a frame, a dial mounted on opposite sides of the frame, thermo-responsive mechanism including a Bourdon spring having one end attached to said frame, a shaft mounted in said frame coaxially with said spring, a member secured to said shaft, an element mounted on said member and provided with two identical peripheries, said element being radially adjustable with respect to said member, means for translating motion of the free end of said spring into a corresponding movement of said shaft and said element, a pair of shafts mounted in alignment with respect to each other and parallel to said first shaft, an index on each of said shafts of the pair, each index being movable over its respective dial, a flexible connection operating over each of said peripheries of said element to one of said shafts, said connections being effective at opposite sides of said shafts whereby the same are rotated in opposite directions, and means tending to oppose the movements of said pair of shafts due to said connections.

4. In an indicating thermometer, a graduated dial, a rotatable shaft provided with an index movable with respect to said dial, a pulley on said shaft, a rotatable plate movable on an axis parallel to said shaft and having an arcuate periphery, said plate having limited movement radially with respect to its axis to adjust the setting of said index with respect to the graduations on said dial, means including a thermo-responsive member for rotating said plate, a flexible element attached at one end to and engaging a portion of the arcuate periphery of said plate, the other end of said element being attached to and engaging the periphery of the pulley, and means tending to rotate said shaft in a direction opposite to that due to the movement of the thermo-responsive element.

HARRY Y. NORWOOD.